United States Patent [19]
Ladabaum et al.

[11] Patent Number: 5,894,452
[45] Date of Patent: Apr. 13, 1999

[54] MICROFABRICATED ULTRASONIC IMMERSION TRANSDUCER

[75] Inventors: Igal Ladabaum, San Carlos; Butrus Thomas Khuri-Yakub, Palo Alto; Hyongsok Soh, Stanford, all of Calif.

[73] Assignee: The Board of Trustees of the Leland Stanford Junior University, Palo Alto, Calif.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/741,404

[22] Filed: Oct. 29, 1996

Related U.S. Application Data

[63] Continuation-in-part of application No. 08/327,210, Oct. 21, 1994, Pat. No. 5,619,476.

[51] Int. Cl.⁶ .................................................. H04R 23/00
[52] U.S. Cl. ...................... 367/163; 367/174; 381/113; 381/116; 381/174; 381/191
[58] Field of Search ............................... 367/163, 174; 381/113, 116, 174, 191

[56] References Cited

U.S. PATENT DOCUMENTS

| | | | |
|---|---|---|---|
| 3,715,638 | 2/1973 | Polye | 317/247 |
| 3,736,552 | 5/1973 | Sessler et al. | 340/5 MP |
| 3,786,495 | 1/1974 | Spence | 340/365 |
| 3,946,422 | 3/1976 | Yagi et al. | 357/26 |
| 3,973,146 | 8/1976 | Arnold et al. | 357/26 |
| 4,081,626 | 3/1978 | Muggli et al. | 179/111 R |
| 4,246,449 | 1/1981 | Biber | 179/111 R |
| 4,262,399 | 4/1981 | Cady | 29/25.42 |
| 4,429,192 | 1/1984 | Busch-Vishniac et al. | 179/111 |
| 4,432,007 | 2/1984 | Cady | 357/26 |
| 4,439,641 | 3/1984 | Paglia | 179/111 R |
| 4,530,077 | 7/1985 | Dorr | 367/140 |
| 4,533,795 | 8/1985 | Baumbauer et al. | 179/111 E |
| 4,783,821 | 11/1988 | Muller et al. | 381/173 |
| 4,816,125 | 3/1989 | Muller et al. | 204/192.18 |
| 4,887,246 | 12/1989 | Hossack et al. | 367/140 |
| 4,887,248 | 12/1989 | Griebeler | 367/181 |
| 4,910,840 | 3/1990 | Sprenkels et al. | 29/25.41 |
| 4,922,471 | 5/1990 | Kuehnel | 367/181 |
| 5,208,789 | 5/1993 | Ling | 367/181 |
| 5,408,731 | 4/1995 | Berggvist et al. | 29/25.41 |
| 5,493,470 | 2/1996 | Zavracky et al. | 361/283.4 |
| 5,619,476 | 4/1997 | Haller et al. | 367/181 |
| 5,633,552 | 5/1997 | Lee et al. | 310/311 |
| 5,684,324 | 11/1997 | Bernstein | 257/415 |

FOREIGN PATENT DOCUMENTS

892773   7/1949   Germany.

*Primary Examiner*—J. Woodrow Eldred
*Attorney, Agent, or Firm*—Flehr Hohbach Test Albritton & Herbert LLP

[57] ABSTRACT

An ultrasonic capacitance transducer having a sealed membrane supported above a conductive substrate by thin insulating material to form a sealed evacuated cavity whereby the transducer can operate immersed in fluid.

18 Claims, 6 Drawing Sheets

FIG_1

FIG_3

FIG_4

FIG_2A

FIG_2B

FIG_2C

FIG_2D

FIG_2E

FIG_2F

FIG_2G

FIG_2H

FIG_5

FIG_6

FIG_7A

FIG_7B

FIG_7C

MICROFABRICATED ULTRASONIC IMMERSION TRANSDUCER

This application is a continuation-in-part of application Ser. No. 08/327,210, filed Oct. 21, 1994, now patent U.S. Pat. No. 5,619,476.

BRIEF DESCRIPTION OF THE INVENTION

This invention relates generally to ultrasonic transducers and more particularly to microfabricated ultrasonic immersion transducers and to a method of fabricating such transducers.

BACKGROUND OF THE INVENTION

Ultrasonic transducers are used to emit and detect ultrasonic waves in particular media of interest. Ultrasonic waves are used in various applications, including nondestructive evaluation, medical imaging, ranging, and signal processing (filters, delay lines, convolvers, etc.). Depending on the application, the ultrasonic waves need to be excited in and detected from either solids, liquids, or gases. Piezoelectric transducers work very well with solids. However, due to the acoustic impedance mismatch between piezoelectric ceramics and less dense media such as liquids and gases, piezoelectric devices are not the optimal performers in many applications. Capacitive transducers are a better alternative in airborne ultrasonic applications, and if they can be microfabricated, have distinct advantages in fluid immersion applications.

The fabrication of microfabricated ultrasonic transducers which operate on an electrostatic principle is described in co-pending patent application Ser. No. 08/327,210 filed Oct. 21, 1994 and a broadband version of such transducers is described in patent application Ser. No. 08/739,446 filed Oct. 29, 1996 (filed simultaneously herewith).

Applications where ultrasound is used in liquid media are currently very significant. From medical ultrasound to industrial cleaning, fluid coupled ultrasound is used in most economically important applications. Because of the fabrication advantages inherent in microfabricating and because of the increased transmission power and receive sensitivity of capacitive transducers, there is a need for microfabricated fluid immersion capacitive transducers.

OBJECTS AND SUMMARY OF THE INVENTION

It is an object of the present invention to provide an immersion microfabricated ultrasonic transducer.

It is a further object of the present invention to provide a method of fabricating microfabricated ultrasonic transducers having reproducible sealed membranes spaced from an underlying conductive substrate.

It is a further object of the present invention to provide an ultrasonic immersion sealed membranes microfabricated ultrasonic transducer having membranes which can be of selected sizes and shapes.

It is a further object of the present invention to provide robust vacuum sealed ultrasonic transducers which can operate immersed in liquid or gas.

It is another object of the present invention to provide microfabricated membranes closely spaced from an underlying substrate and supported at their edges by a layer of insulating material to define with said substrate an evacuated cavity and to a method of fabricating such sealed membranes.

In accordance with the present invention, there is provided a microfabricated transducer which includes a conductive substrate and a sealed membrane supported in close proximity to the substrate by an insulating film or layer with the support, substrate and membrane defining, a sealed, evacuated cavity. The invention also relates to a method of forming such transducer employing conventional semiconductor processing techniques.

BRIEF DESCRIPTION OF THE DRAWINGS

The foregoing and other objects of the invention will be more clearly understood from the following detailed description when read in conjunction with the accompanying drawings, wherein:

FIG. 5 is a SEM of a multiple element transducer in accordance with the present invention.

FIG. 6 shows the results of transmission through air of the microfabricated ultrasonic transducer of FIG. 5 operated at the resonant frequency of the membranes.

FIGS. 7A–7C show the results of three water transmission experiments with excitation with four cycles, sixteen volts tone bursts.

DESCRIPTION OF PREFERRED EMBODIMENT(S)

Figure 1:
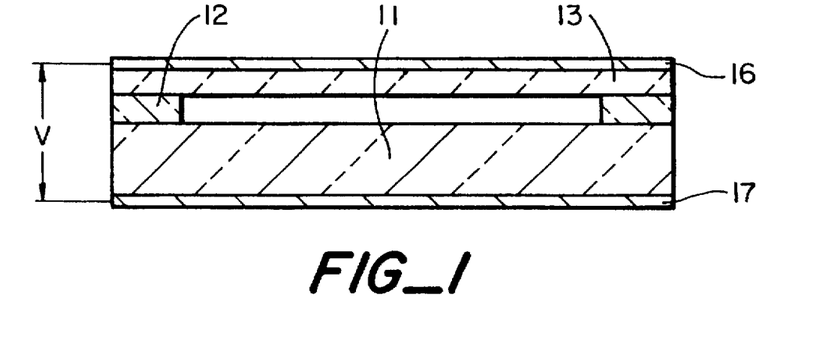
FIG. 1 is a sectional view showing a single membrane immersion type microfabricated ultrasonic transducer element.

FIG. 1 is an enlarged, sectional view of a microfabricated single membrane ultrasonic immersion transducer element in accordance with the present invention. The transducer element includes a conductive silicon substrate 11, silicon dioxide layer 12 which supports the membrane at its edges and a sealed silicon nitride layer (membrane) 13. Contact layers or films 16 and 17, such as gold, are formed on the surface of the silicon nitride layer and the lower surface of the substrate. An excitation voltage V is applied across the films 16 and 17. Electrostatic fields are formed between the conductive silicon substrate and the upper electrode 16. These fields deflect the nitride membrane 13 supported by the silicon dioxide layer. The fields displace the membrane 13 which displaces the medium (air, water or other fluid) in contact with the gold electrode. By applying high frequency voltages, ultrasonic waves are generated in the medium. For example, a circular membrane 50 microns in diameter can be immersed to generate ultrasonic waves at frequencies from 0 to tens of MHz. The same transducer when operating in air generates ultrasonic waves around 6 MHz. On the other hand, the transducer may receive sound waves which would deflect the silicon nitride membrane and provide changes in capacitance which can be detected across the conductive electrodes. The operation of microfabricated ultrasonic transducer for ultrasound transmission and detection in air is well known and will not be further described herein.

Figure 2A:
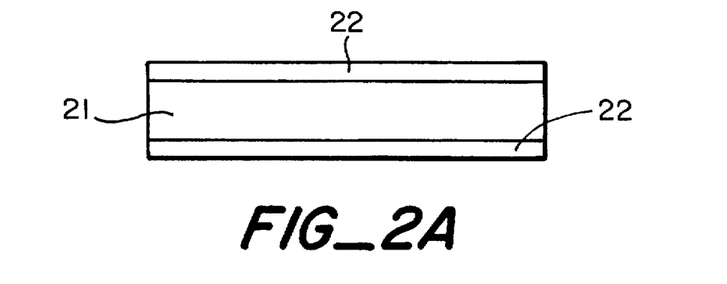
FIGS. 2A–2G illustrate the steps in forming an ultrasonic transducer array in accordance with the present invention.
Figure 2B:
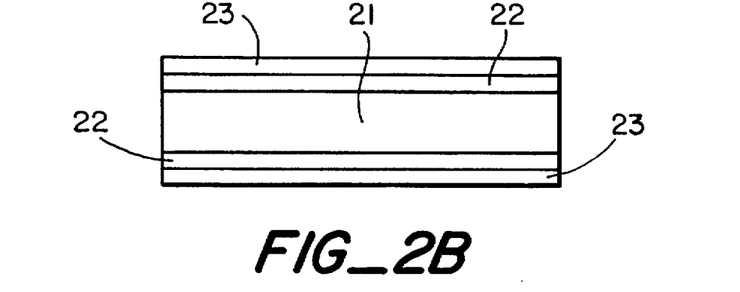
Figure 2C:
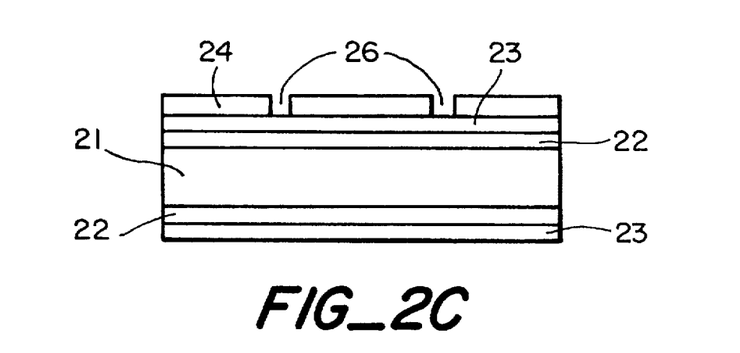
Figure 2D:
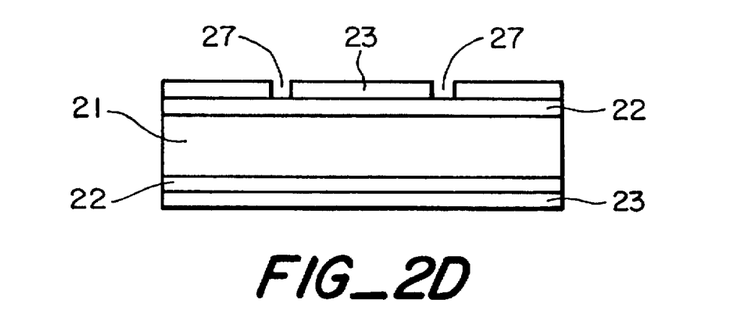
Figure 2E:
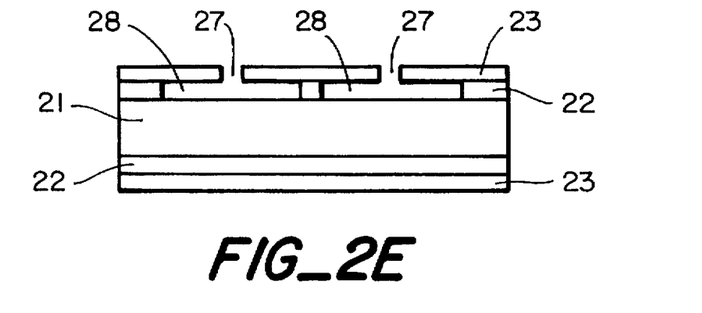
Figure 2F:
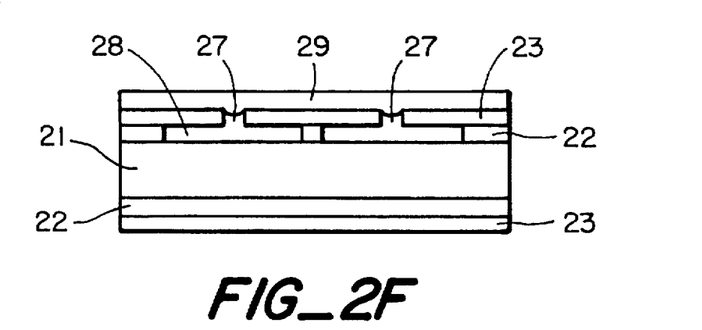
Figure 2G:
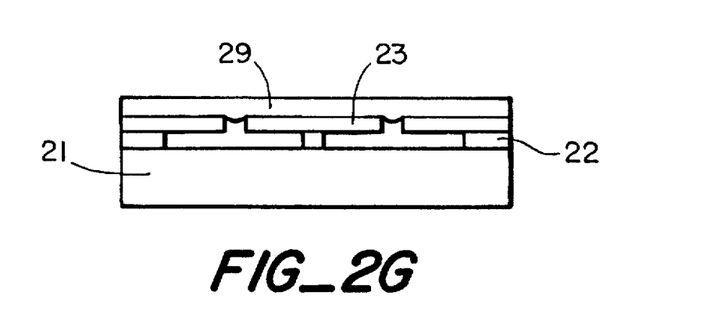
Figure 2H:
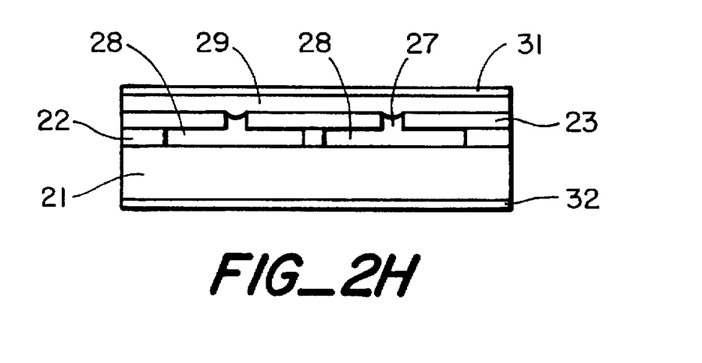
Figure 3:
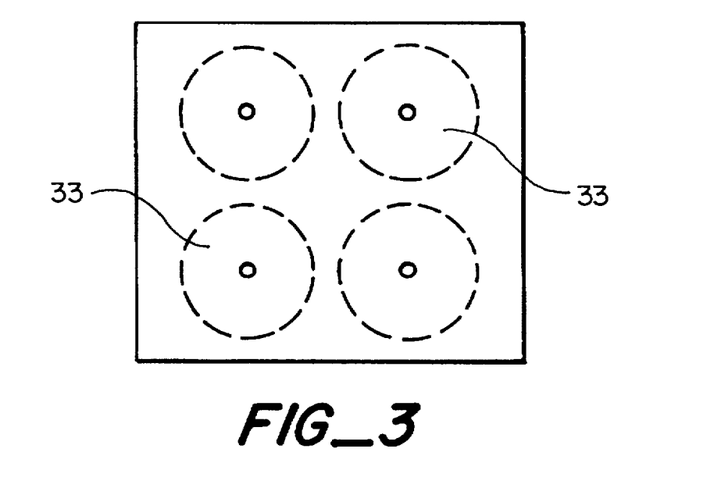
FIG. 3 is a top plan view showing circular membranes formed in accordance with the process shown in FIGS. 2A–2H.

FIGS. 2A–2H schematically illustrate the steps in forming a multi-element evacuated microfabricated electrostatic ultrasonic transducer. The starting material is a silicon substrate 21 which can be oxidized to form silicon dioxide films 22 of predetermined thickness, FIG. 2A. A silicon nitride film 23 is deposited on the silicon dioxide film on both major surfaces, FIG. 2B. The silicon nitride film 23 may be formed to have a predetermined level of stress. For example, a silicon nitride film formed by chemical vapor deposition employing silane and ammonia can have its residual stress controlled by controlling the proportion of silane to ammonia during the deposition process. A resist film 24, FIG. 2C, is then formed on the upper surface of the silicon nitride. The resist film is lithographically or e-beam patterned and etched to form windows 26. The nitride film then is etched to form windows or apertures 27 and the resist removed, FIG. 2D. The silicon dioxide can then be etched by employing hydrofluoric acid which passes through the apertures 27 and etches the underlying silicon dioxide to form cavities 28 beneath each of the holes or openings 27, FIG. 2E. The apertures 27 are preferably 0.3 microns or less in diameter. A layer of silicon nitride 29 is then formed on the surface whereby the silicon nitride extends into and seals the holes 27, FIG. 2F. The silicon nitride is deposited, for example, in an evacuated chemical vapor deposition chamber whereby sealing of the holes leaves evacuated cavities 28. In certain applications, it may be desired to have sealed cavities which are at atmospheric or other pressures. In such instances, the sealing can take place in an atmospheric pressure chemical vapor deposition (APCVD) chamber. The bottom silicon nitride and silicon oxide films are then removed, FIG. 2G. Top and bottom gold electrodes 31 and 32 may then be deposited on the major surfaces, FIG. 2G. The resulting transducer has multiple membranes 33 as shown in FIG. 3F. By way of examples, etching time may be selected to form membranes having 50 micron diameters which would operate at a frequency of 6 MHz, in air.

Figure 4:
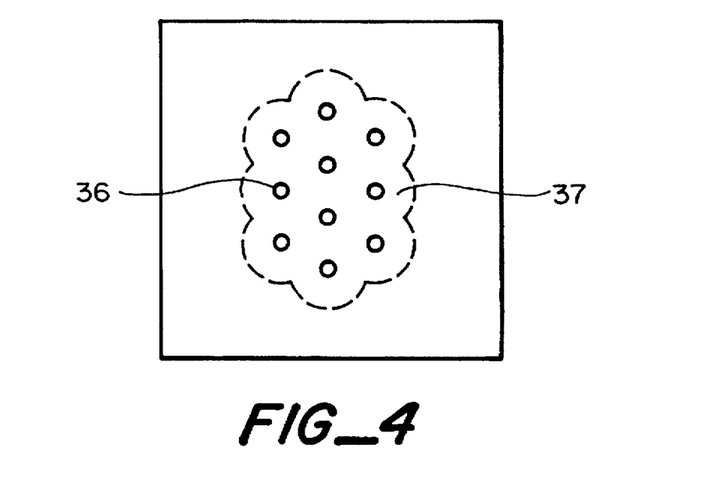
FIG. 4 is a top plan view illustrating the formation of membranes having selected size and shape.

The size and shape of the membrane can be controlled by providing a plurality of closely spaced apertures or openings 27 in the nitride through which the hydrofluoric acid may attack or etch the underlying silicon dioxide layer. For example, in FIG. 4, ten holes 36 are shown disposed in a hexagonal pattern whereby etching through the holes for a predetermined period of time will form a hexagonal membrane 37 which is supported at its edges by the silicon dioxide film. The membrane is then sealed by applying a silicon nitride layer under vacuum to form an evacuated immersion transducer. Sealed microfabricated transducers can have membranes which range from 50 to 7500 μm², gap thickness ranging from 0.05 to 1 μm, nitride thickness ranging from 0.1 to 2 μm, residual stress from 10 to 400 MPa, and absolute cavity pressures from approximately 100 mTorr to atmospheric.

Figure 7B:
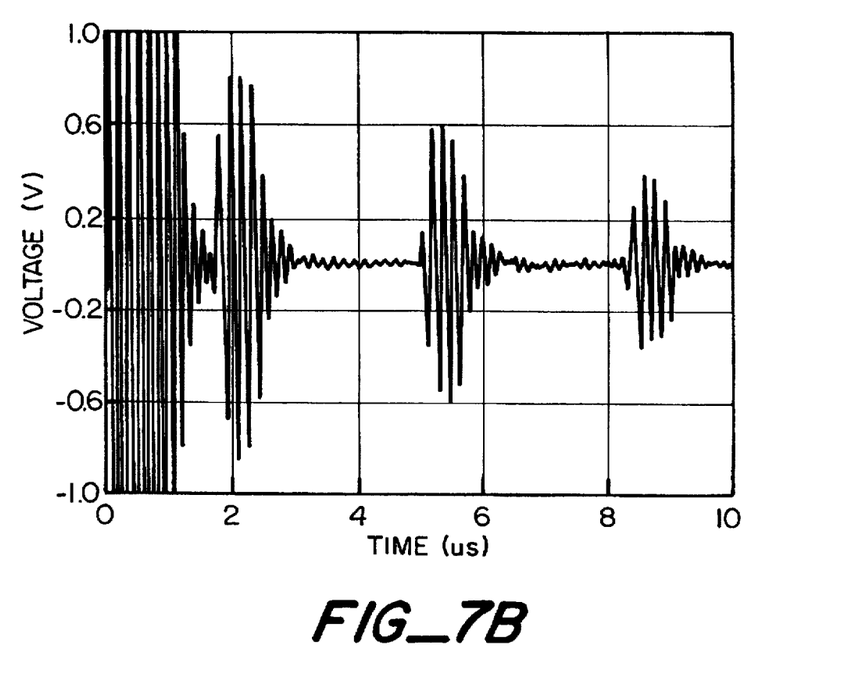
Figure 7C:
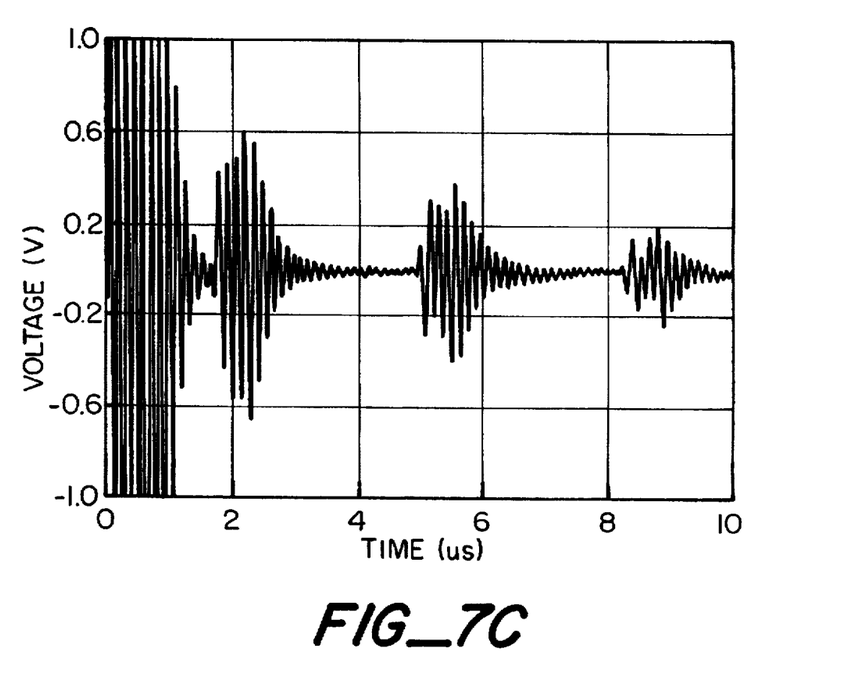

FIG. 5 shows a SEM of a transducer formed in accordance with the foregoing process and having a number of hexagonal membranes. In particular, a transducer having 50 micron hexagonal membranes was constructed by providing approximately sixty one 0.3 micron apertures on 5 micron centers. The total area of the transducer was one centimeter squared. The thickness of the oxide layer was 10,000 Å providing a close spacing of the silicon nitride membrane to the underlying substrate. The nitride was 6000 Å thick with a residual stress of approximately 200 megapascals. The device was operated by applying ten cycles, sixteen volt tone bursts at a frequency of 6 MHZ. FIG. 6 shows the result of transmission through air at 6 MHZ. FIGS. 7A–C show the result of three water transmission experiments with excitation with four cycles, 16 volt tone bursts. FIG. 7A shows transmission in water with a 4 MHz burst, FIG. 7B with a 6 MHz burst, and FIG. 7C with a 8 MHz burst. In the figures, electromagnetic feedthrouagh is followed by the acoustic signal, and in the case of water, many subsequent echos. The echos indicate that the microfabricated ultrasonic transducers are not well matched to the medium. This result is expected because the transducer was optimized for air operation, not water immersion.

A plurality of multi-element transducers can be formed on a linear or two dimensional array of transducers which are selectively excited to scan a line or area.

The Geometry of the device including gap thickness, membrane thickness and area can be controlled to optimize the transducer for water operation. Efficiencies of such transducers are reduced by the fact that the microfabricated ultrasonic transducers comprise thousands of active membranes joined by inactive supporting structures. The inactive supporting structure is responsible for reduced efficiency so that its surface area should be minimized. The supporting layer or structure described is silicon oxide. It is apparent that all that is required is that the support structure be of insulating material. An example of a parlyene, insulatory support structure is described in patent application Ser. No. 08/739,446 filed Oct. 29, 1996.

What is claimed:

1. A microfabricated ultrasonic transducer including:
   a conductive substrate;
   a plurality of silicon nitride membranes having one or more holes;
   an insulating support supporting, each of said membranes above said substrate; and
   a silicon nitride layer formed by chemical vapor deposition on said membranes extending partially into and sealing said openings to form a sealed cavity defined by said substrate, insulating support and sealed membrane; and
   a conductive film on the outer surface of the silicon nitride membrane.

2. A microfabricated ultrasonic transducer as in claim 1 in which the sealed cavity is evacuated.

3. A microfabricated transducer as in claim 2 in which said holes have a diameter of less than 0.3 microns.

4. A microfabricated transducer as in claims 1, 2, or 3 in which said insulating support is less than one micron in thickness.

5. A microfabricated transducer as in claim 4 in which the silicon nitride membrane is less than one micron thick.

6. A microfabricated transducer as in claim 4 in which the silicon nitride membrane is between 0.1 and 2 μm thick.

7. A microfabricated transducer as in claim 4 in which said silicon nitride membrane is between 0.1 and 2 μm thick and has a residual stress between 10 and 400 MPa.

8. A microfabricated ultrasonic transducer as in claim 1 in which the pressure in the sealed cavity is between 100 mTorr and atmospheric.

9. An ultrasonic transducer including:
   a conductive silicon substrate;
   a plurality of silicon nitride membranes having one or more apertures less than 0.3 microns in diameter;
   supports comprising thin insulating material supporting each of said membranes above the substrate;
   a sealing silicon nitride layer formed on said membranes extending at least partially into said apertures to seal the membrane;
   a thin metal film making electrical connection to the outer surface of said silicon nitride layer; and,
   a thin metal film making electrical connection to the other surface of said conductive substrate.

10. A microfabricated ultrasonic transducer as in claim 9 which said sealed membrane, insulating support and substrate form a sealed cavity.

11. A microfabricated ultrasonic transducer as in claim 10 in which the sealed cavity is evacuated.

12. A microfabricated transducer as in claims 9, 10, or 11 in which said insulating support is less than one micron in thickness.

13. A microfabricated transducer as in claim 12 in which the silicon nitride membrane is less than one micron thick.

14. A microfabricated transducer as in claim 12 in which the silicon nitride membrane is between 0.1 and 2 μm thick.

15. A microfabricated transducer as in claim 12 in which said silicon nitride membrane is between 0.1 and 2 μm thick and has a residual stress between 10 and 400 MPa.

16. A microfabricated ultrasonic transducer as in claim 12 in which the pressure in the sealed cavity is between 100 mTorr and atmospheric.

17. A microfabricated ultrasonic transducer array comprising a plurality of transducers as in claim 9 arranged in line.

18. A microfabricated ultrasonic transducer array comprising a plurality of transducers as in claim 9 arranged in a two dimensional array.

* * * * *

UNITED STATES PATENT AND TRADEMARK OFFICE
CERTIFICATE OF CORRECTION

PATENT NO. : 5,894,452
DATED : April 13, 1999
INVENTOR(S) : Ladabaum et al.

It is certified that error appears in the above-indentified patent and that said Letters Patent is hereby corrected as shown below:

Col. 1, line 8, before "BRIEF DESCRIPTION OF THE INVENTION" insert the following:

GOVERNMENT SUPPORT

This invention was made with Government support under Contract N00014-94-1-0730 awarded by the Department of the Navy ONR. The Government has certain rights in this invention.

Signed and Sealed this

Second Day of November, 1999

Attest:

Q. TODD DICKINSON

Attesting Officer

Acting Commissioner of Patents and Trademarks